United States Patent
Wein, Jr.

(10) Patent No.: US 9,054,511 B1
(45) Date of Patent: Jun. 9, 2015

(54) SHEET METAL STRUCTURE HAVING TWIST-OUT TABS FOR REMOVING A KNOCKOUT

(71) Applicant: Adtran, Inc., Huntsville, AL (US)

(72) Inventor: Paul S. Wein, Jr., New Market, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 14/199,366

(22) Filed: Mar. 6, 2014

(51) Int. Cl.
*B32B 3/24* (2006.01)
*H02G 3/08* (2006.01)
*E06B 3/30* (2006.01)
*E06B 9/00* (2006.01)

(52) U.S. Cl.
CPC *H02G 3/085* (2013.01); *E06B 3/30* (2013.01); *E06B 9/00* (2013.01); *E06B 2009/002* (2013.01)

(58) Field of Classification Search
CPC ............... Y10T 428/12188; Y10T 428/12194; Y10T 428/15; Y10T 29/4979; Y10T 29/49792; H02G 3/085
USPC ....................... 428/43, 571, 572; 29/413, 414
See application file for complete search history.

(56) References Cited

U.S. PATENT DOCUMENTS

2010/0084188 A1* 4/2010 Rajvanshi et al. ............ 174/666

\* cited by examiner

*Primary Examiner* — Alexander Thomas
(74) *Attorney, Agent, or Firm* — Smith Risley Tempel Santos LLC; Michael J. Tempel

(57) ABSTRACT

A knockout can be removed from a parent part in a sheet metal structure by removing one or more twistable tabs located on a perimeter of the knockout. A tab is defined by a region of sheet metal within a perimeter consisting of a first and a second cut. The first and second cuts extend through the sheet metal along first and second paths. A first neck extends between the first end of the first cut and the first end of the second cut and between the tab and the parent part. A second neck extends between the second end of the first cut and the second end of the second cut and extends between the tab and the knockout. To remove the tab, the tab is rotated such that the two necks twist about an axis between them, until torsional fatigue fractures the necks.

18 Claims, 5 Drawing Sheets

SHEET METAL STRUCTURE HAVING TWIST-OUT TABS FOR REMOVING A KNOCKOUT

BACKGROUND

Enclosures and panels made of sheet metal are commonly used to enclose or otherwise protect electrical and electronic equipment. Such a sheet metal structure may include one or more knockouts. A knockout is a severable region of the sheet metal. A knockout comprises a region of the sheet metal having a perimeter that is partly removed or partly weakened (e.g., made frangible) with respect to the surrounding sheet metal or "parent part." A portion of the perimeter remains intact until the knockout is removed.

To form a knockout, a punch tool, laser, or similar cutting or perforating tool can be used to cut into the surface of the sheet metal on the perimeter. To remove the knockout, a person can strike the tab with a hammer, screwdriver or other tool that delivers an impact force. As a result of the impact, an intact (e.g., frangible) portion of the perimeter fractures, and the knockout breaks free from the parent part along the perimeter. The person can then remove the knockout from the parent part. Various types of knockouts are known.

In some types of knockouts, the cut that defines the perimeter extends completely through the thickness of the sheet metal, i.e., all material along sections of the perimeter is completely removed. In other types of knockouts, the cut that defines the perimeter comprises a groove that extends only partly through the thickness of the sheet metal. That is, a cut extends from the first surface of the sheet metal to a depth between the first surface and second surfaces. Between the bottom of the cut and the second surface the perimeter is defined not by the cut but rather by a break or weakness that makes the perimeter (or sections thereof) frangible.

In some types of knockouts, the perimeter is defined by removed sections of metal or frangible sections of metal except for one or more short, narrow sections or necks at which the knockout adjoins and connects with the parent part. The neck may be too wide or otherwise too tough to readily fracture by striking the knockout with a tool. To remove such a knockout, a person must not only strike the knockout to break the knockout free along the portions of the perimeter that are removed or frangible, but the person must also then break the neck. For example, such a neck commonly can be broken by bending or twisting the knockout until the metal is so weakened or fatigued that it breaks. Once the knockout is free from the parent part at all points along the perimeter, the person can then remove the knockout from the parent part.

Removing a knockout by the impact-based method described above can undesirably deform the surrounding sheet metal of the parent part because some of the impact force is transferred to the surrounding sheet metal. This problem is especially acute in removing larger panel-shaped knockouts, as it is difficult to apply an impact force uniformly throughout the knockout.

SUMMARY

Embodiments of the invention relate to a sheet metal structure comprising a knockout, one or more tabs, and a parent part, and to a method for removing the knockout from the parent part. In an exemplary embodiment, the knockout has a knockout perimeter comprising a plurality of knockout cuts. Each knockout cut extends completely through the sheet metal along a continuous elongated path. Each tab is disposed on the knockout perimeter and is defined by a region of the sheet metal enclosed within a tab perimeter. The tab perimeter consists of a first cut, a second cut, a first neck and a second neck. The first cut extends completely through the sheet metal along a first continuous elongated path between a first end of the first cut and a second end of the first cut. The second cut extends completely through the sheet metal along a second continuous elongated path between a first end of the second cut and a second end of the second cut. The first neck extends between the first end of the first cut and the first end of the second cut and extends between the tab and the parent part. The second neck extends between the second end of the first cut and the second end of the second cut and extends between the tab and the knockout. Each of the first and second necks is subject to torsional fatigue in response to rotation of the tab about an axis between the first and second necks.

In the exemplary embodiment, a method for removing the knockout from the parent part includes removing the one or more tabs by twisting each tab about an axis between the first and second necks until torsional fatigue fractures the first and second necks. After the tabs are removed, the knockout can be removed from the parent part.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
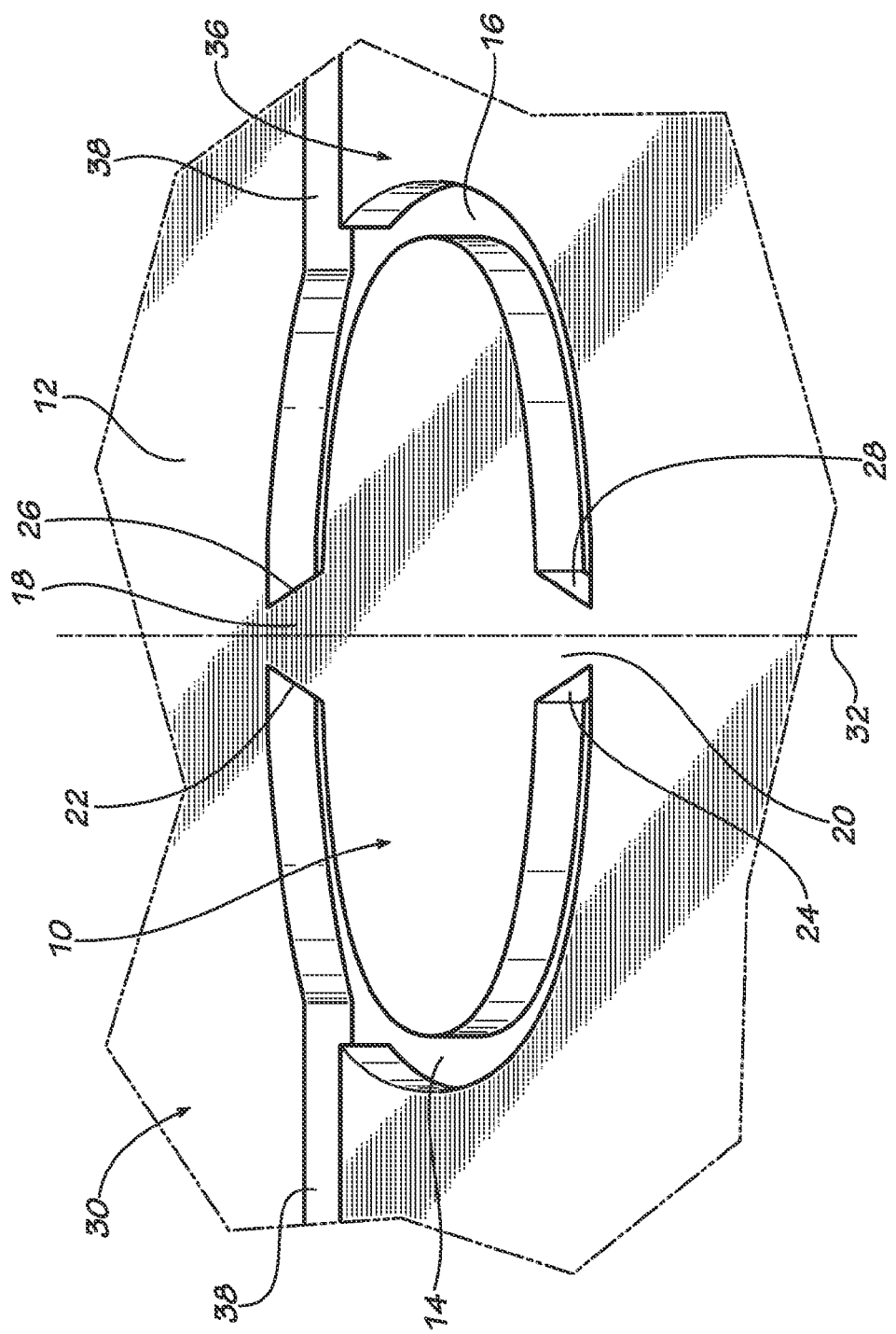
FIG. 1 is a perspective view of a tab, in accordance with an exemplary embodiment of the invention.

As illustrated in FIG. 1, in an illustrative or exemplary embodiment of the invention, a sheet metal structure includes one or more tabs 10 located in a sheet of metal, i.e., "sheet metal" 12. Sheet metal 12 can have any suitable thickness or gauge. For example, sheet metal 12 can be of the type that is commonly used in the fabrication of enclosures for electrical and electronic equipment. Each tab 10 is defined by a region of sheet metal 12 enclosed within a tab perimeter consisting of a first tab cut 14, a second tab cut 16, a first neck 18 and a second neck 20. First tab cut 14 extends completely through sheet metal 12 along a first continuous elongated path between a first end 22 of first tab cut 14 and a second end 24 of first tab cut 14. Likewise, second tab cut 16 extends completely through sheet metal 12 along a second continuous elongated path between a first end 26 of second tab cut 16 and a second end 28 of second tab cut 16. First neck 18 extends between first end 22 of first tab cut 14 and first end 26 of second tab cut 16. First neck 18 also extends between tab 10 and the parent part 30. Parent part 30 can, for example, be part of an enclosure for electrical or electronic equipment. Such an enclosure is not shown for purposes of clarity, as the structure and fabrication of such sheet metal enclosures is well understood in the art. Similarly, second neck 20 extends between second end 24 of first tab cut 14 and second end 28 of second tab cut 16. Note that first and second necks 18 and 20 are located on an axis 32. Although in the exemplary embodiment axis 32 bisects tab 10 such that there is an equal area on either side of axis 32, in other embodiments (not shown) the areas on either side of such an axis can differ from each other.

Although in the exemplary embodiment the tab perimeter, consisting of first tab cut 14, second tab cut 16, first neck 18 and second neck 20, has an oval shape, in other embodiments (not shown) such a tab perimeter can have any other suitable shape. Also, although in the exemplary embodiment first tab cut 14 and second tab cut 16 extend along respective substantially C-shaped first and second continuous elongated paths, in such other embodiments (not shown) such first and second continuous elongated paths can have any other suitable shape. Although in the exemplary embodiment first tab cut 14 and second tab cut 16 extend along respective first and second continuous elongated paths that are identical in shape to each other, in other embodiments (not shown) such first and second tab cuts can have shapes that differ from each other. Furthermore, although in the exemplary embodiment first tab cut 14 and second tab cut 16 extend along respective first and second continuous elongated paths that are curvilinear, in other embodiments one or both such first and second tab cuts can extend along paths that are not curvilinear, such as paths that include rectilinear, i.e., straight, portions. Also, although in the exemplary embodiment first tab cut 14 and second tab cut 16 extend along respective first and second continuous elongated paths having curvatures with constant signs (i.e., curvatures that do not change direction), in other embodiments one or both such first and second tab cuts can extend along paths that change direction, e.g., zig-zag.

Figure 2A:
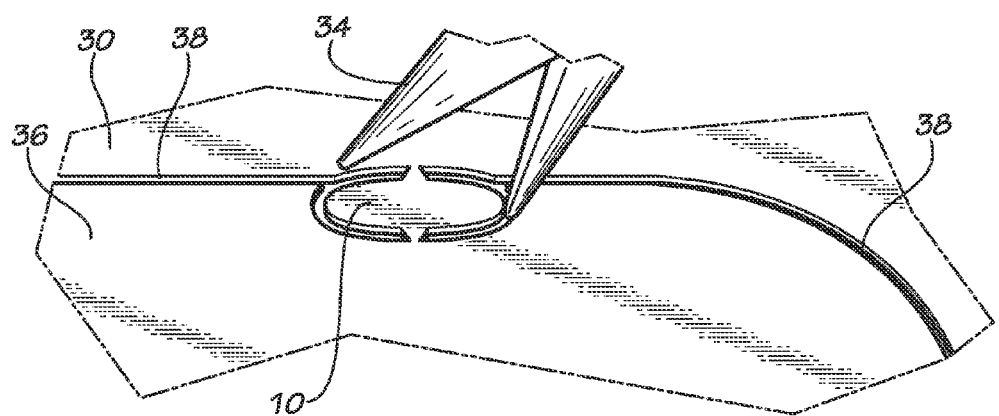
FIG. 2A is a perspective view of the tab of FIG. 1, showing the use of a tool to grasp the tab.
Figure 2B:
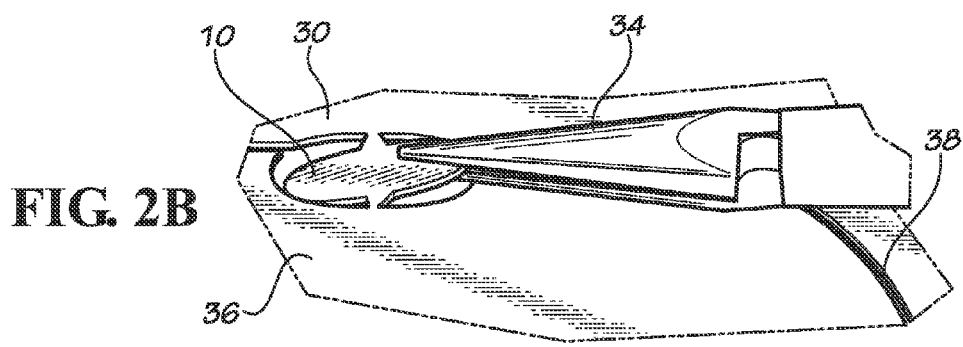
FIG. 2B is similar to FIG. 2A, showing the tab beginning to be twisted to remove it from a parent part and knockout.
Figure 2C:
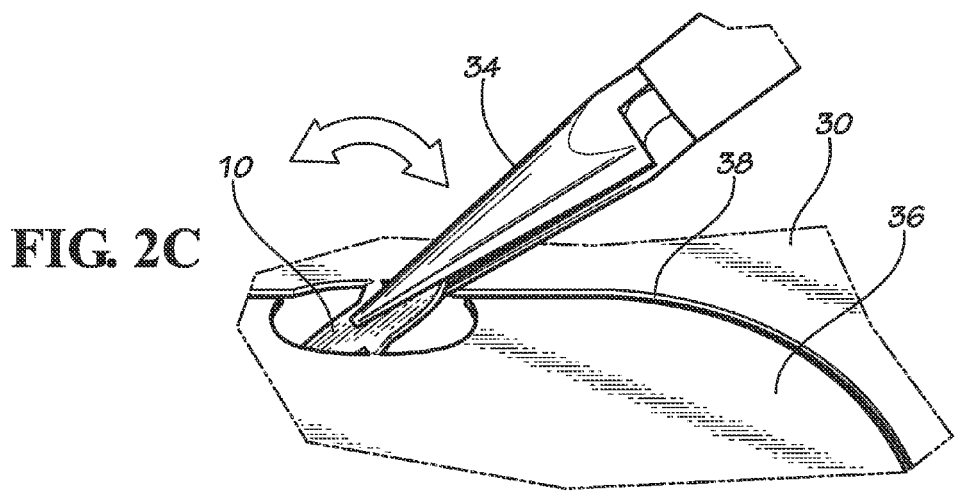
FIG. 2C is similar to FIGS. 2A-B, showing the tab being further twisted.
Figure 2D:
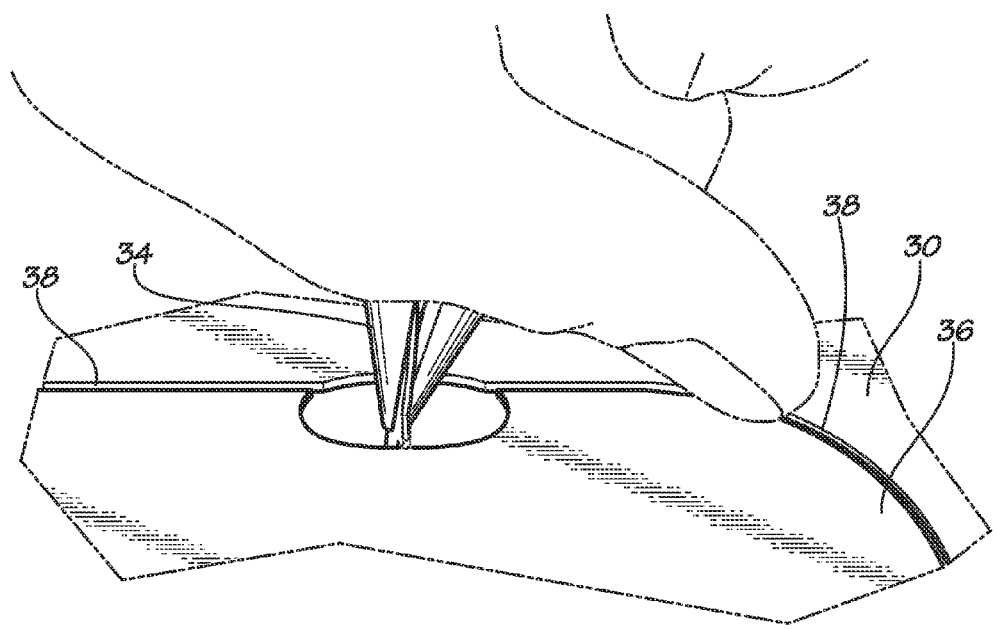
FIG. 2D is similar to FIGS. 2A-C, showing the tab being still further twisted.
Figure 2E:
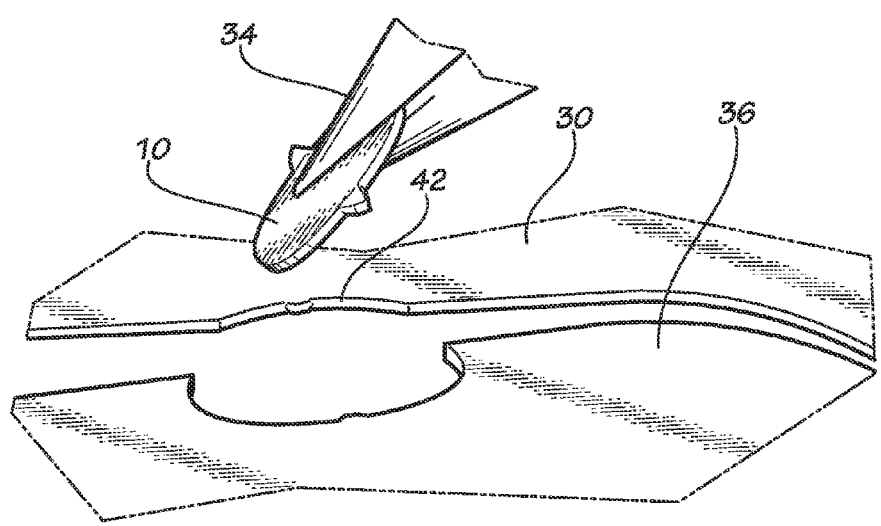
FIG. 2E is similar to FIGS. 2A-D, showing the tab being removed from the parent part and knockout.

As illustrated in FIGS. 2A-2E, a person can use a tool 34, such as a pair of pliers, to remove tab 10 from parent part 30. Grasping tab 10 with tool 34 as shown in FIG. 2B, the user can then twist or rotate tab 10 about axis 32 (FIG. 1). As the user further twists or rotates tab 10 as shown in FIG. 2C and still further twists or rotates tab 10 as shown in FIG. 2D, torsional fatigue increasingly weakens first and second necks 18 and 20. The user can continue twisting or rotating tab 10 until such torsional fatigue fractures first and second necks 18 and 20. The user can rotate tab 10 in only one direction or, alternatively, rock tab 10 back and forth in both directions as indicated by the double-headed arrow in FIG. 2C. Once first and second necks 18 and 20 have been fractured or broken, the user can remove tab 10 from parent part 30 as illustrated in FIG. 2E.

Although necks 18 and 20 can be of any suitable size, and sheet metal 12 can be of any suitable thickness or gauge, it may be useful to facilitate the above-described tab removal method by selecting a neck size and shape that is not excessively difficult to fracture using a hand tool. For example, necks 18 and 20 can have a torsional fatigue life equivalent to, for example, about ten complete rotations of tab 10 about axis 32. In other words, it may be useful to avoid a person having to twist, rock, or otherwise rotate tab 10 more than an amount that is equivalent to, for example, about five complete rotations. Five rotations is intended only as an example of a suitable maximum number of rotations required to fracture necks 18 and 20 under torsional fatigue (a parameter commonly referred to in the art as torsional fatigue life), and persons skilled in the art are readily capable of selecting a neck size and shape that enables a user to fracture necks 18 and 20 within any selected torsional fatigue life. It may also be useful to provide no portion of tab 10 with a lower torsional fatigue life than the torsional fatigue life of necks 18 and 20, to promote tab 10 remaining intact during its removal. That is, it may be expedient or otherwise useful to be able to remove tab 10 in one piece.

Figure 3A:
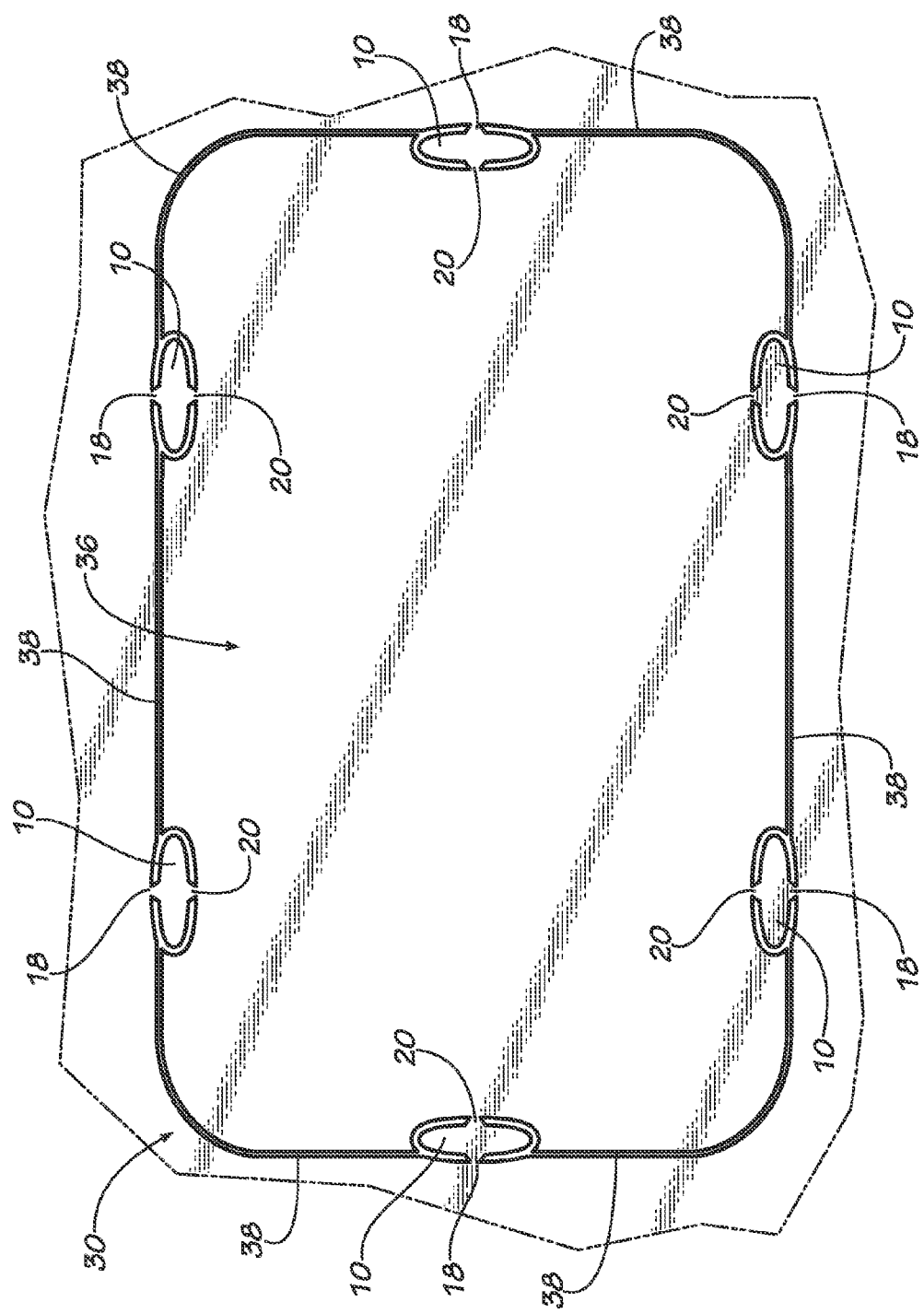
FIG. 3A is a perspective view of a parent part and a knockout, with a number of tabs located along a knockout perimeter.

As illustrated in FIG. 3A, a sheet metal structure can include a panel-shaped knockout 36 in sheet metal 12. Panel-shaped knockout 36 has a knockout perimeter and is larger than tab 10, i.e., has an area greater than the area of tab 10. The knockout perimeter includes a number of knockout cuts 38. Each knockout cut 38 extends completely through sheet metal 12 along a continuous elongated path. A number of tabs 10 are located along the knockout perimeter. Although in exemplary embodiment the sheet metal structure includes six knockout cuts 38 and six tabs 10, in other embodiments (not shown) such a sheet metal structure can include any other suitable number of such cuts and tabs. Also, although in the exemplary embodiment tabs 10 are arranged symmetrically with respect to each other along the knockout perimeter, in other embodiments some or all of such tabs can be arranged asymmetrically or in any other suitable arrangement.

Note that the first neck 18 of each tab 10 is disposed on the knockout perimeter and extends between tab 10 and parent part 30, while the second neck 20 extends between tab 10 and panel-shaped knockout 36. It can also be noted that the knockout perimeter consists of the six knockout cuts 38 and the first neck 18 of each of the six tabs 10. Nevertheless, in other embodiments the knockout perimeter can include any number of such knockout cuts and any other suitable portions of the tabs or tab perimeters. It can further be noted that in the exemplary embodiment axis 32 (FIG. 1) of each tab 10 is perpendicular to a portion of the knockout perimeter, and the tab perimeter is substantially tangent to the knockout perimeter.

Figure 3B:
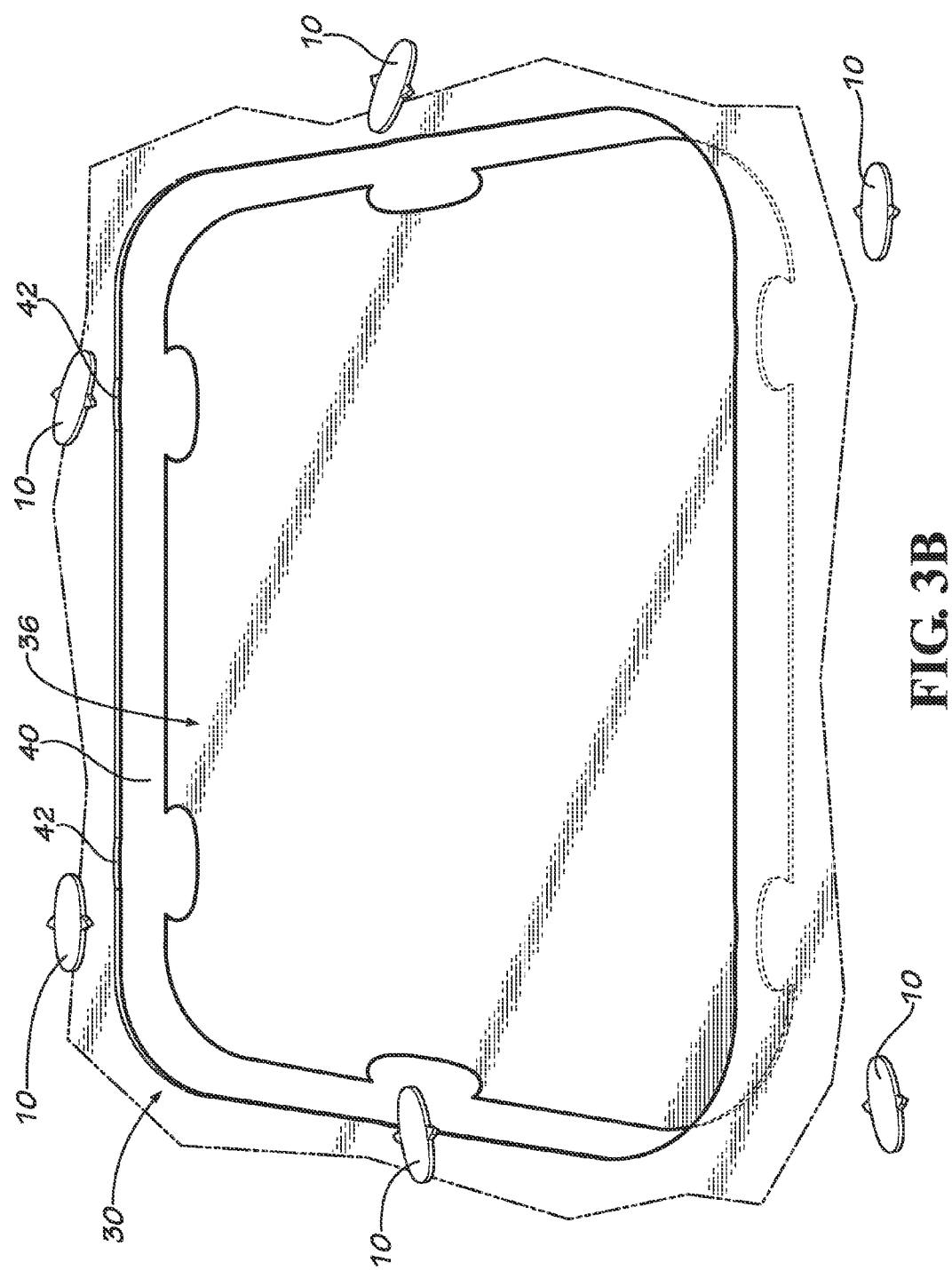
FIG. 3B is similar to FIG. 3A, illustrating removal of the tabs to allow removal of the knockout from the parent part.

As illustrated in FIG. 3B, a person can remove panel-shaped knockout 36 from parent part 30 after removing all tabs 10 from parent part 30 in the manner described above with regard to FIGS. 2A-2E. Note in FIG. 1 that because the tab perimeter of each tab 10 is substantially tangent to the knockout perimeter, removing panel-shaped knockout 36 leaves an opening 40 in parent part 30 having substantially straight or linear sides. These sides or walls are only "substantially" straight rather than exactly straight in the sense that the area of parent part 30 occupied by a portion of tab 10 or its perimeter before tab 10 is removed is relatively small, such that the concavity 42 (see also FIG. 2E) that remains in the wall of opening 40 after removing tab 10 is accordingly small and generally unnoticeable to the casual observer. Thus, opening 40 has a substantially rectangular appearance. Although in exemplary embodiment opening 40 that is left in the sheet metal structure after removal of panel-shaped knockout 36 is substantially rectangular, in other embodiments (not shown) such an opening that is left in such a sheet metal structure after removal of such a panel can have any other suitable shape.

One or more illustrative or exemplary embodiments of the invention have been described above. However, it is to be understood that the invention is defined by the appended claims and is not limited to the specific embodiments described.

What is claimed is:

1. A sheet metal structure, comprising:
   a parent part formed in a portion of the sheet metal;
   a knockout having a knockout perimeter comprising a plurality of knockout cuts, each knockout cut extending completely through the sheet metal along a continuous elongated path; and
   a tab disposed on the knockout perimeter, the tab defined by a region of the sheet metal enclosed within a tab perimeter, the tab perimeter consisting of a first cut, a second cut, a first neck and a second neck, the first cut extending completely through the sheet metal along a first continuous elongated path between a first end of the first cut and a second end of the first cut, the second cut extending completely through the sheet metal along a second continuous elongated path between a first end of the second cut and a second end of the second cut, the first neck extending between the first end of the first cut and the first end of the second cut and extending between the tab and the parent part, the second neck extending between the second end of the first cut and the second end of the second cut and extending between the tab and the knockout, each of the first and second necks subject to torsional fatigue in response to rotation of the tab about an axis between the first and second necks.

2. The sheet metal structure of claim 1, further comprising a plurality of the tabs, each disposed on the knockout perimeter.

3. The sheet metal structure of claim 2, wherein:
   the sheet metal structure comprises a plurality of tabs disposed symmetrically with respect to each other along the knockout perimeter;
   the first neck of each tab of the plurality of tabs is disposed on the knockout perimeter;
   the knockout perimeter consists of a plurality of the knockout cuts and the first neck of each of the plurality of tabs; and
   the second neck of each of the plurality of tabs extends between the tab and the knockout.

4. The sheet metal structure of claim 3, wherein the axis of each tab of the plurality of tabs is perpendicular a portion of the knockout perimeter.

5. The sheet metal structure of claim 1, wherein the axis bisects the tab.

6. The sheet metal structure of claim 1, wherein the first cut and the second cut are identical in shape.

7. The sheet metal structure of claim 6, wherein:
   the first continuous elongated path is curvilinear; and
   the second continuous elongated path is curvilinear.

8. The sheet metal structure of claim 7, wherein the
   the first continuous elongated path is substantially C-shaped; and
   the second continuous elongated path is substantially C-shaped.

9. The sheet metal structure of claim 7, wherein the perimeter has an oval shape.

10. A method for removing a knockout from a parent part in a sheet metal structure, the knockout having a knockout perimeter comprising a plurality of knockout cuts and a tab disposed on the knockout perimeter, each knockout cut extending completely through the sheet metal along a continuous elongated path, the tab defined by a region of the sheet metal enclosed within a tab perimeter, the tab perimeter consisting of a first cut and a second cut, the first cut extending completely through the sheet metal along a first continuous elongated path between a first end of the first cut and a second end of the first cut, the second cut extending completely through the sheet metal along a second continuous elongated path between a first end of the second cut and a second end of the second cut, a first neck extending between the first end of the first cut and the first end of the second cut and extending between the tab and the parent part, a second neck extending between the second end of the first cut and the second end of the second cut, the method comprising:
    twisting the tab about an axis between the first and second necks until torsional fatigue fractures the first and second necks;
    separating the tab from the parent part after the first and second necks fracture; and
    separating the knockout from the parent part after separating the tab from the parent part.

11. The method claim 10, wherein the sheet metal structure comprises a plurality of the tabs disposed on the knockout perimeter, and the method comprises separating each of the plurality of tabs from the parent part.

12. The method of claim 11, wherein the plurality of tabs are disposed symmetrically with respect to each other along the knockout perimeter, the first neck of each of the plurality of tabs is disposed on the knockout perimeter, the knockout perimeter consists of a plurality of cuts and the first neck of each of the plurality of tabs, and the second neck of each of the plurality of tabs extends between the tab and the knockout, and the method further comprises:
    separating each of the plurality of tabs from the parent part;
    wherein the step of separating the knockout from the parent part after separating the tab from the parent part comprises separating the knockout from the parent part after separating each of the plurality of tabs from the parent part.

13. The method of claim 12, wherein the axis of each tab of the plurality of tabs is perpendicular a portion of the knockout perimeter.

14. The method of claim 10, wherein the axis bisects the tab.

15. The method of claim 10, wherein the first cut and the second cut are identical in shape.

16. The method of claim 15, wherein:
    the first continuous elongated path is curvilinear; and
    the second continuous elongated path is curvilinear.

17. The method of claim 16, wherein the
    the first continuous elongated path is substantially C-shaped; and
    the second continuous elongated path is substantially C-shaped.

18. The method of claim 16, wherein the perimeter has an oval shape.

* * * * *